(12) United States Patent
Olvera-Hernandez

(10) Patent No.: US 7,787,397 B2
(45) Date of Patent: Aug. 31, 2010

(54) METHOD AND APPARATUS FOR MAPPING 3GPP SERVICE PRIMITIVES TO MEDIA INDEPENDENT HANDOVER EVENT SERVICES

(75) Inventor: Ulises Olvera-Hernandez, Kirkland (CA)

(73) Assignee: InterDigital Technology Corporation, Wilmington, DE (US)

( * ) Notice: Subject to any disclaimer, the term of this patent is extended or adjusted under 35 U.S.C. 154(b) by 549 days.

(21) Appl. No.: 11/554,392

(22) Filed: Oct. 30, 2006

(65) Prior Publication Data
US 2007/0104116 A1  May 10, 2007

Related U.S. Application Data

(60) Provisional application No. 60/733,703, filed on Nov. 4, 2005.

(51) Int. Cl.
*H04L 12/28* (2006.01)
*H04W 4/00* (2009.01)
*H04J 3/22* (2006.01)

(52) U.S. Cl. .................. 370/254; 370/328; 370/469

(58) Field of Classification Search .......... 370/331, 370/329, 201, 242, 401, 469, 466, 412; 455/436, 455/437, 426; 379/221, 242, 230, 201
See application file for complete search history.

(56) References Cited

U.S. PATENT DOCUMENTS

| 6,055,561 | A * | 4/2000 | Feldman et al. ............. 709/200 |
| 7,483,984 | B1 | 1/2009 | Jonker et al. |
| 7,505,834 | B1 | 3/2009 | Keller |
| 2003/0114158 | A1 | 6/2003 | Soderbacka et al. |
| 2003/0148775 | A1 * | 8/2003 | Spriestersbach et al. .... 455/456 |
| 2003/0153276 | A1 | 8/2003 | Terry et al. |
| 2003/0210713 | A1 * | 11/2003 | Abdel-Ghaffar ........... 370/503 |
| 2004/0066757 | A1 | 4/2004 | Molteni et al. |
| 2004/0068571 | A1 * | 4/2004 | Ahmavaara ................ 709/228 |

(Continued)

FOREIGN PATENT DOCUMENTS

WO         03/105516        12/2003

OTHER PUBLICATIONS

TSGR2#5(99)905—TSG-RAN Working Group 2 (Radio layer 2 and Radio layer 3), Sophia Antipolis, Aug. 16, 1999, (Primitives between MAC and RLC).*

(Continued)

*Primary Examiner*—Vincent P Harper
*Assistant Examiner*—Mahendra Patel
(74) *Attorney, Agent, or Firm*—Volpe & Koenig, P.C.

(57) ABSTRACT

A Third Generation Partnership Project (3GPP) media independent handover (MIH) service access point (SAP) is configured to provide MIH event services, (e.g., IEEE 802.21 event services), by mapping service primitives to the MIH event services. The service primitives may be 3GPP service primitives which originate from at least one of a radio resources (RR) layer, a logical link control (LLC) layer, a general packet radio service (GPRS) mobility management (GMM) layer, a session management (SM) layer, a non-access stratum (NAS), an access stratum (AS) and an evolved universal terrestrial radio access (E-UTRA)/evolved core network (E-CORE) system. The event services may include a link parameter change event service, a link up event service, a link going down event service, a link down event service, a handover complete event service and a link detected event service.

30 Claims, 11 Drawing Sheets

U.S. PATENT DOCUMENTS

| | | | |
|---|---|---|---|
| 2005/0221824 A1 | 10/2005 | Lee et al. | |
| 2005/0249161 A1* | 11/2005 | Carlton | 370/331 |
| 2005/0289618 A1* | 12/2005 | Hardin | 725/95 |
| 2006/0092864 A1* | 5/2006 | Gupta et al. | 370/278 |
| 2006/0183479 A1* | 8/2006 | Liu et al. | 455/436 |
| 2006/0221899 A1* | 10/2006 | Feder et al. | 370/331 |
| 2007/0041344 A1* | 2/2007 | Yaqub et al. | 370/331 |
| 2007/0054625 A1* | 3/2007 | Beale | 455/69 |
| 2007/0072611 A1* | 3/2007 | Feder et al. | 455/436 |
| 2007/0076670 A1* | 4/2007 | Kuchibhotla et al. | 370/336 |
| 2009/0268661 A1* | 10/2009 | Ng et al. | 370/328 |

OTHER PUBLICATIONS

TSGR1 (00)1353—TSG-RAN Working Group 1 Meeting #17, Stockholm Sweden, Nov. 21, 2000, (Radio link Synchronization Primitives).*

3GPP TSG-CN Meeting #25, CR on Rel-6WI "MBMS" towards TS 44.065, Sep. 8, 2004, (SNDCP-MBMS communication layer service primitives).*

"Media Independent Handover", IEEE 802.21 Media Independent Handover Services, Joint Harmonized Contribution, May 2005.

"Proposed IEEE 802.21 Presentation for 3GPP", IEEE 802.21 Media Independent Handover, 3GPP Liaison Package Development Ad hoc Group, Sep. 20, 2005, XP-002428337.

"Media Independent Handover Functions and Services Specification", IEEE 802.21 MIHO, Jul. 13, 2006.

ETSI TS 124 007 V7.0.0 (Sep. 2005); "Digital cellular telecommunications system (Phase 2+); Universal Mobile Telecommunications System (UMTS); Mobile radio interface signalling layer 3; General Aspects" (3GPP TS 24.007 version 7.0.0 Release 7).

"3$^{rd}$ Generation Partnership Project; Technical Specification Group Services and Systems Aspects; 3GPP System Architecture Evolution: Report on Technical Options and Conclusions (Release 7)" Draft 3GPP TR 23.882 V0.6.0 (Sep. 2005).

"3$^{rd}$ Generation Partnership Project; Technical Specification Group Services and System Aspects; 3GPP System Architecture Evolution: Report on Technical Options and Conclusions (Release 7)", 3GPP TR 23.882 V1.4.2 (Oct. 2006).

Draft IEEE Standard for Local and Metropolitan Area Networks: Media Independent Handover Services; IEEE P802.21/D00.03, Oct. 2005.

CWTS/CATT, "Dedicated channel synchonisation," TSG-RAN Working Group 1 meeting #17, TSGR1(00)1353 (Nov. 21-24, 2000).

LGIC, "CR to 25.321 for MAC Assisted Dynamic Radio Access Bearer Control (revised version)," TSG-RAN Working Group 2 (Radio layer 2 and radio layer 3), TSGR2#5(99)905 (Aug. 16-20, 1999).

TSG CN WG1, "CR on Rel-6 WI "MBMS" towards TS 44.065," 3GPP TSG-CN Meeting #25, NP-040387 (Sep. 8-10, 2004).

* cited by examiner

METHOD AND APPARATUS FOR MAPPING 3GPP SERVICE PRIMITIVES TO MEDIA INDEPENDENT HANDOVER EVENT SERVICES

CROSS REFERENCE TO RELATED APPLICATION

This application claims the benefit of U.S. Provisional Application No. 60/733,703 filed Nov. 4, 2005, which is incorporated by reference as if fully set forth.

FIELD OF INVENTION

The present invention relates to wireless communication systems. More particularly, the present invention relates to mapping of Third Generation Partnership Project (3GPP) service primitives to media independent handover (MIH) event services as defined within the IEEE 802.21 standard.

BACKGROUND

The IEEE 802.21 standard relates to mechanisms and procedures that aid in the execution and management of inter-system handovers. Under the IEEE 802.21 standard, three main services can be accessed by mobility management (MM) applications in order to aid in the management of handover operations and system discovery and system selection. These three services include an event service, an information service and a command service, which are delivered to prospective users using a common uniform interface, regardless of the underlying access technologies supporting the communication towards the core network.

A method which supports the delivery of event services is needed to determine when an event is to be triggered based on the prevailing characteristics of the underlying technology. The underlying technology could be supported by the 3GPP specification, 3GPP2 and wireless local area networks (WLANs), (e.g., IEEE 802.11 or IEEE 802.16), and the like.

Currently, there are no procedures or functionality to generate triggers toward upper layers, based on information provided by the 3GPP underlying layers. The IEEE 802.21 specification outlines triggers that should be sent to upper layers. However, the IEEE 802.21 specification does not describe how events are triggered when the underlying physical resources are based on 3GPP technology. Therefore a method capable generating these triggers is required.

SUMMARY

The present invention is related to a 3GPP-MIH service access point (SAP) which is configured to provide MIH event services, (e.g., IEEE 802.21 event services), by mapping service primitives to the MIH event services. The service primitives may be 3GPP service primitives which originate from at least one of a radio resources (RR) layer, a logical link control (LLC) layer, a general packet radio service (GPRS) mobility management (GMM) layer, a session management (SM) layer, a non-access stratum (NAS), an access stratum (AS) and an evolved universal terrestrial radio access (E-UTRA)/evolved core network (E-CORE) system. The event services may include a link parameter change event service, a link up event service, a link going down event service, a link down event service, a handover complete event service and a link detected event service.

The present invention uses existing service primitives already defined within 3GPP in order to trigger events that can be used for the determination of handover operations. These service primitives are mapped onto concrete IEEE 802.21 events as defined in IEEE 802.21, as a means to optimize inter-system handover operations.

The present invention provides a method to trigger MIH events, using existing 3GPP radio resource management (RRM), MM and session management (SM) service primitives. The concept of service primitives mapping is extended using mobility management procedures and concepts introduced within both long term evolution (LTE) and system architecture evolution (SAE) within the 3GPP specifications.

The present invention may be applicable to IEEE 802 standards including WLAN baseline air interface standards such as IEEE 802.11 baseline, IEEE 802.11a orthogonal frequency division multiplex (OFDM) 5 GHz WLAN, IEEE 802.11b high rate direct sequence spread spectrum (HR-DSSS) 2.4 GHz WLAN, IEEE 802.11g OFDM 2.4 GHz WLAN, IEEE 802.11j OFDM 10 MHz option WLAN, IEEE 802.11n high-throughput WLAN, and IEEE 802.16 broadband wireless access systems. The WLAN standards supplement to extend operation for particular scenarios such as IEEE 802.21 MIH.

The present invention is also applicable to cellular standards, such as 3GPP or 3GPP2, and other standardized or proprietary wireless technologies similar to IEEE 802 WLANs, examples notably include 802.15 Bluetooth, and HIPERLAN/2.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

The present invention is based on the use existing and new, (e.g., LTE and SAE), primitives within 3GPP that can be mapped onto IEEE 802.21 events as defined by the IEEE 802.21 specification.

A primitive is an abstract representation of functions such as an information function, an event or a command.

An MIH event service classifies, filters and reports changes within the link layer characteristics, (i.e., maximum offered throughput, supported bandwidth, or the like), the link status, (i.e., an indicator of whether the link is operational or not), and the link quality, (e.g., low signal strength). Event services may also indicate changes in the state and transmission behavior of the physical, data link and logical link layers. Furthermore, event services are used to indicate an operation state as a result of a management action.

Figure 1:
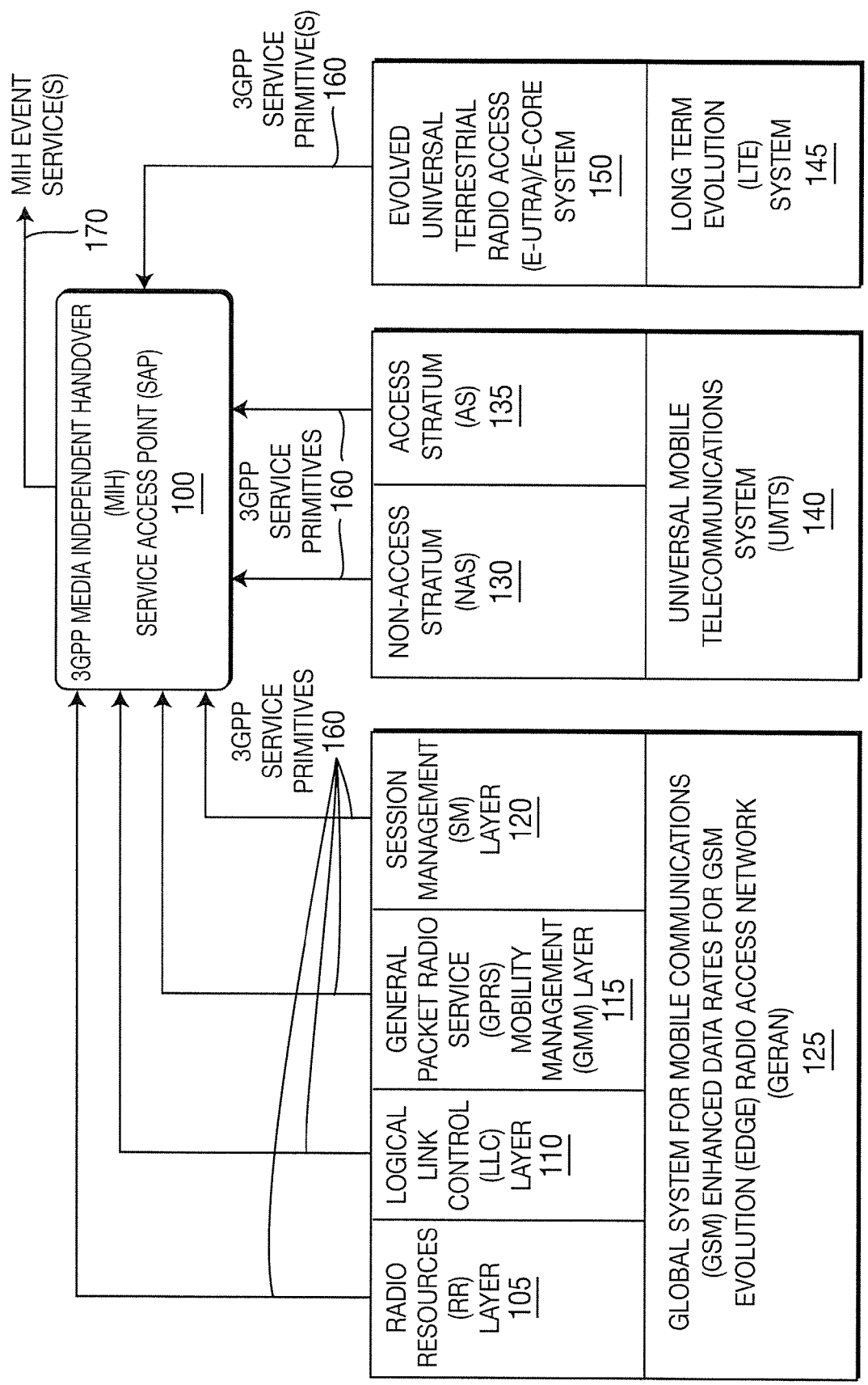
FIG. 1 shows an 3GPP-MIH SAP which maps 3GPP service primitives, received from various 3GPP entities, to MIH event services in accordance with the present invention.

FIG. 1 is a mapping model for 3GPP layer primitives, where a 3GPP-MIH service access point (SAP) 100 maps 3GPP service primitives to MIH event services according to IEEE 802.xx standards.

As shown in FIG. 1, a radio resources (RR) layer 105, an LLC layer 110, a general packet radio service (GPRS) mobility management (GMM) layer 115, and a session management (SM) layer 120 associated with a global system for mobile communications (GSM)/enhanced data rates for GSM evolution (EDGE) radio access network (GERAN) 125 send 3GPP service primitives 160 to the 3GPP-MIH SAP 100. Furthermore, the non-access stratum (NAS) 130 and the access stratum (AS) 135 of a universal mobile telecommunications system (UMTS) services 140 send 3GPP service primitives 160 to the SAP 100. An LTE system 145 sends 3GPP service primitives 160 via an evolved universal terrestrial radio access (E-UTRA) and evolved core network (E-CORE) layers 155 to the SAP 100. The SAP outputs MIH event services 170 in response to receiving the 3GPP service primitives 160.

Figure 2:
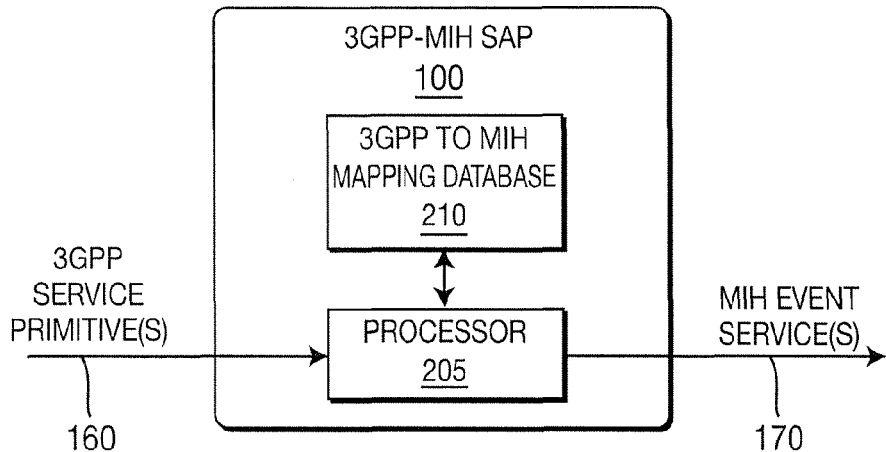
FIG. 2 is an exemplary block diagram of the MIH-GPP SAP of FIG. 1.

FIG. 2 is an exemplary block diagram of the 3GPP-MIH SAP 100 of FIG. 1. The 3GPP-MIH SAP 100 includes a processor 205 and a 3GPP to MIH mapping database 210. When the SAP 100 receives a 3GPP service primitive 160, the processor 205 in the SAP 100 interprets, (i.e., identifies), the 3GPP service primitive 160 in terms of functional capabilities and potential parameters. The processor 205 then queries the mapping database 210 based on such functional capabilities and parameters to obtain and output the MIH event services 170.

Table 1 identifies specific 3GPP service primitives for each of the layers of the GERAN 125 shown in FIG. 1. According to the present invention, the 3GPP service primitives generated by the GERAN 125 via the RR layer 105, the LLC layer 110, the GMM layer 115 and the SM layer 120 are mapped to MIH event services, (e.g., IEEE 802.21 events), as shown in Table 1 below.

outputs a link up event service or a link parameter change event service in response to receiving a 3GPP service primitive from the LLC layer 110 that indicates that a peer LLC layer has been established. This MIH event service may be applicable to any type of standard, such as IEEE 802.21 and the like.

Figure 6:
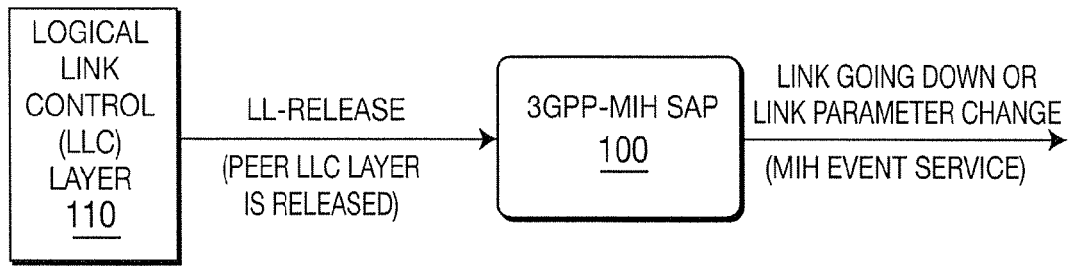
FIG. 6 is an example of mapping a 3GPP service primitive to an MIH event service when a peer LLC layer is released.

FIG. 6 is an example of mapping a 3GPP service primitive to an MIH event service when a peer LLC layer 110 is released, as indicated by the LLC layer 110. As indicated by Table 1 above, the processor 205 in the SAP 100 illustrated in FIG. 2 outputs a link going down event service or a link parameter change event service in response to receiving a 3GPP service primitive from the LLC layer 110 that indicates that a peer LLC layer has been released. This MIH event service may be applicable to any type of standard, such as IEEE 802.21 and the like.

TABLE 1

| 3GPP Layer | 3GPP Service Primitive Descriptions | 3GPP Service Primitive | MIH Event Service (e.g., IEEE 802.21 Event) |
|---|---|---|---|
| RR | Page received by RR layer | GMRR-PAGE | Link Parameter Change |
| | Successful reception of data supporting specific QoS | GRR-DATA | Link Parameter Change |
| LLC | Peer LLC layer is established | LL-ESTABLISH | Link Up/Link Parameter Change |
| | Peer LLC layer is released | LL-RELEASE | Link Going Down/Link Parameter Change |
| | LLC Layer unrecoverable error | LL-STATUS | Link Down |
| GMM | Station is attached | GMMREG-ATTACH | Link Parameter Change |
| | Station is detached | GMMREG-DETACH | Link Parameter Change |
| SM | Data session active | SMSM-ACTIVE | Link Up/Link Parameter Change |
| | Data session is deactivated | SMSM-DEACTIVATE | Link Down/Link Parameter Change |
| | Data session modified | SMSM-MODIFY | Link Parameter Change |
| | Data session terminated due to unrecoverable error | SMSM-STATUS | Link Down |
| | PDP Context is active | SMREG-PDP-ACTIVATE | Link Up/Link Parameter Change/Handover Complete |
| | PDP Context is modified | SMREG-PDP-MODIFY | Link up/Link Parameter Change/Handover Complete |
| | PDP Context is deactivated | SMREG-PDP-DEACTIVATE | Link Going Down/Link Down |

Figure 3:
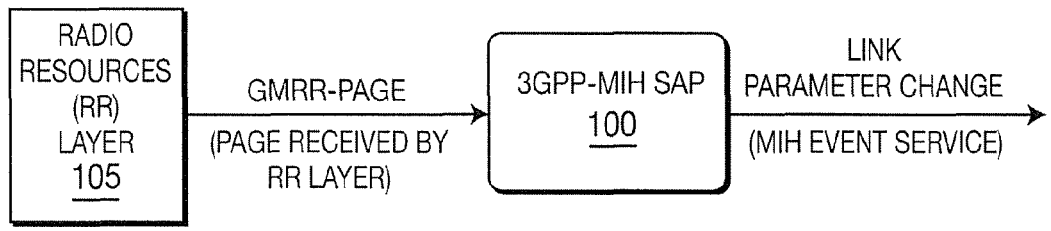
FIG. 3 is an example of mapping a 3GPP service primitive to an MIH event service when a page is received by an RR layer.

FIG. 3 is an example of mapping a 3GPP service primitive to an MIH event service when a page is received by the RR layer 105. As indicated by Table 1 above, the processor 205 in the SAP 100 illustrated in FIG. 2 outputs a link parameter change event service in response to receiving a 3GPP service primitive from the RR layer 105 that indicates that a page was received by the RR layer 105. This MIH event service may be applicable to any type of standard, such as IEEE 802.21 or the like.

Figure 4:
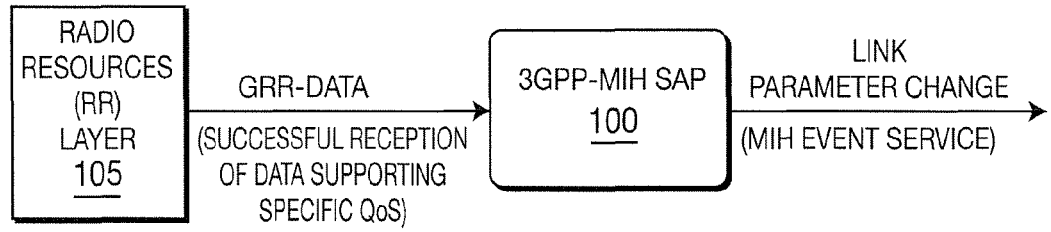
FIG. 4 is an example of mapping a 3GPP service primitive to an MIH event service when data supporting a specific quality of service (QoS) is received by the RR layer.

FIG. 4 is an example of mapping a 3GPP service primitive to an MIH event service when data supporting a specific QoS is received by the RR layer 105. As indicated by Table 1 above, the processor 205 in the SAP 100 illustrated in FIG. 2 outputs a link parameter change event service in response to receiving a 3GPP service primitive from the RR layer 105 that indicates that data supporting a specific QoS is received by the RR layer 105. This MIH event service may be applicable to any type of standard, such as IEEE 802.21 or the like.

Figure 5:
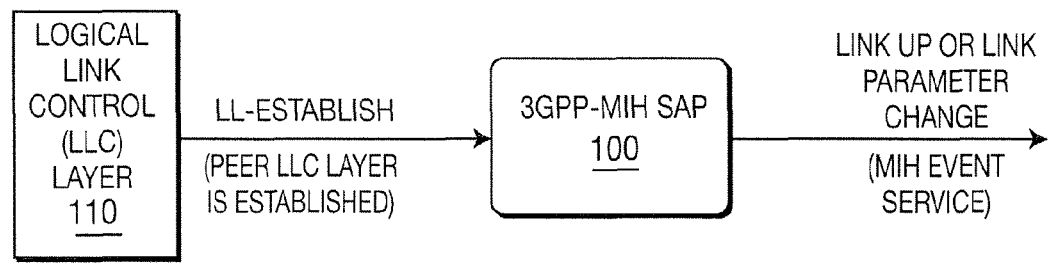
FIG. 5 is an example of mapping a 3GPP service primitive to an MIH event service when a peer LLC layer is established.

FIG. 5 is an example of mapping a 3GPP service primitive to an MIH event service when a peer LLC layer is established, as indicated by the LLC layer 110. As indicated by Table 1 above, the processor 205 in the SAP 100 illustrated in FIG. 2

Figure 7:
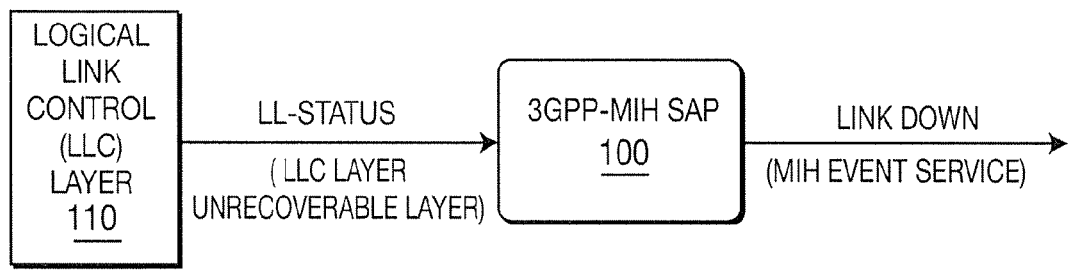
FIG. 7 is an example of mapping a 3GPP service primitive to an MIH event service when an LLC layer unrecoverable error occurs.

FIG. 7 is an example of mapping a 3GPP service primitive to an MIH event service when an LLC layer unrecoverable error occurs, as indicated by the LLC layer 110. As indicated by Table 1 above, the processor 205 in the SAP 100 illustrated in FIG. 2 outputs a link down event service in response to receiving a 3GPP service primitive from the LLC layer 110 that indicates that an LLC layer unrecoverable error has occurred. This MIH event service may be applicable to any type of standard, such as IEEE 802.21 and the like.

Figure 8:
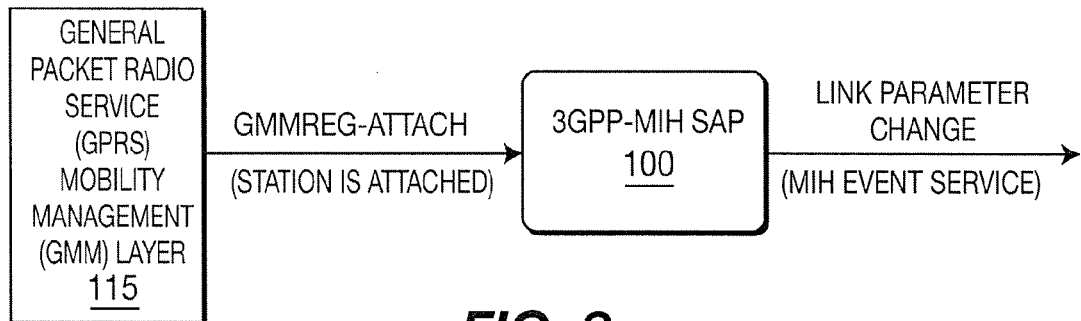
FIG. 8 is an example of mapping a 3GPP service primitive to an MIH event service when a GMM layer indicates that a station is attached.

FIG. 8 is an example of mapping a 3GPP service primitive to an MIH event service when the GMM layer 115 indicates that a station is attached. As indicated by Table 1 above, the processor 205 in the SAP 100 illustrated in FIG. 2 outputs a link parameter change event service in response to receiving a 3GPP service primitive from the GMM layer 115 that indicates that a station is attached. This MIH event service may be applicable to any type of standard, such as IEEE 802.21 and the like.

Figure 9:
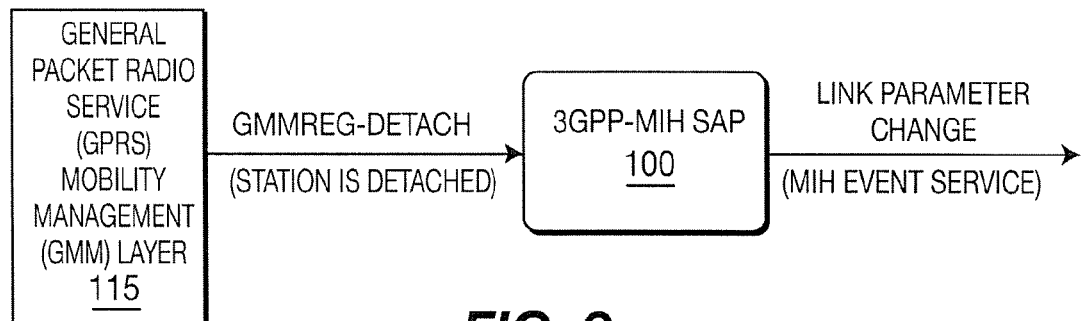
FIG. 9 is an example of mapping a 3GPP service primitive to an MIH event service when a GMM layer indicates that a station is detached.

FIG. 9 is an example of mapping a 3GPP service primitive to an MIH event service when the GMM layer 115 indicates that a station is detached. As indicated by Table 1 above, the processor 205 in the SAP 100 illustrated in FIG. 2 outputs a link parameter change event service in response to receiving a 3GPP service primitive from the GMM layer 115 that indicates that a station is detached. This MIH event service may be applicable to any type of standard, such as IEEE 802.21 and the like.

Figure 10:
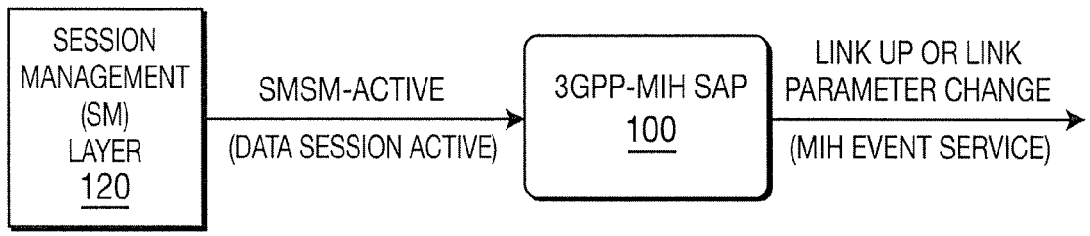
FIG. 10 is an example of mapping a 3GPP service primitive to an MIH event service when an SM layer indicates that a data session is active.

FIG. 10 is an example of mapping a 3GPP service primitive to an MIH event service when the SM layer 120 indicates that a data session is active. As indicated by Table 1 above, the processor 205 in the SAP 100 illustrated in FIG. 2 outputs a link up event service or a link parameter change event service in response to receiving a 3GPP service primitive from the SM layer 120 that indicates that a data session is active. This MIH event service may be applicable to any type of standard, such as IEEE 802.21 and the like.

Figure 11:
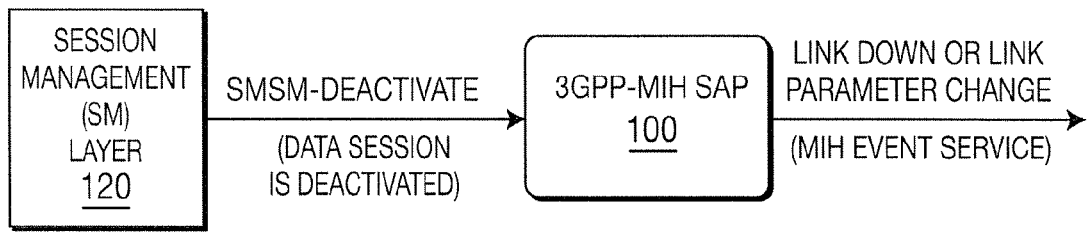
FIG. 11 is an example of mapping a 3GPP service primitive to an MIH event service when an SM layer indicates that a data session is deactivated.

FIG. 11 is an example of mapping a 3GPP service primitive to an MIH event service when the SM layer 120 indicates that a data session is deactivated. As indicated by Table 1 above, the processor 205 in the SAP 100 illustrated in FIG. 2 outputs a link down event service or a link parameter change event service in response to receiving a 3GPP service primitive from the SM layer 120 that indicates that a data session is deactivated. This MIH event service may be applicable to any type of standard, such as IEEE 802.21 and the like.

Figure 12:
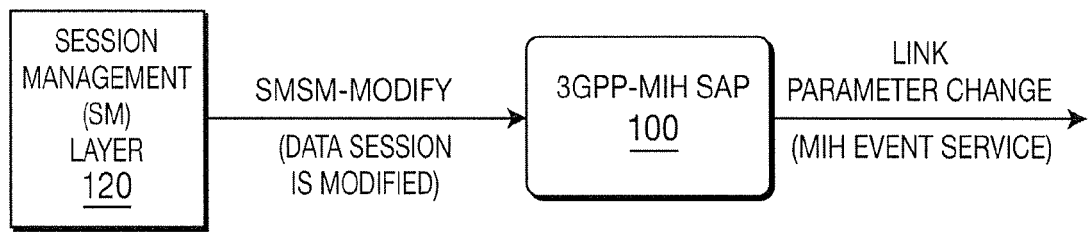
FIG. 12 is an example of mapping a 3GPP service primitive to an MIH event service when an SM layer indicates that a data session is modified.

FIG. 12 is an example of mapping a 3GPP service primitive to an MIH event service when the SM layer 120 indicates that a data session is modified. As indicated by Table 1 above, the processor 205 in the SAP 100 illustrated in FIG. 2 outputs a link parameter change event service in response to receiving a 3GPP service primitive from the SM layer 120 that indicates that a data session has been modified. This MIH event service may be applicable to any type of standard, such as IEEE 802.21 and the like.

Figure 13:
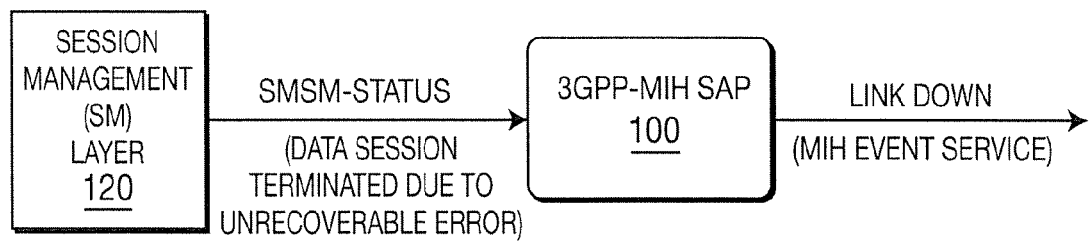
FIG. 13 is an example of mapping a 3GPP service primitive to an MIH event service when an SM layer indicates that a data session is terminated due to an unrecoverable error.

FIG. 13 is an example of mapping a 3GPP service primitive to an MIH event service when the SM layer 120 indicates that a data session is terminated due to an unrecoverable error. As indicated by Table 1 above, the processor 205 in the SAP 100 illustrated in FIG. 2 outputs a link down event service in response to receiving a 3GPP service primitive from the SM layer 120 that indicates that a data session has been terminated due to an unrecoverable error. This MIH event service may be applicable to any type of standard, such as IEEE 802.21 and the like.

Figure 14:
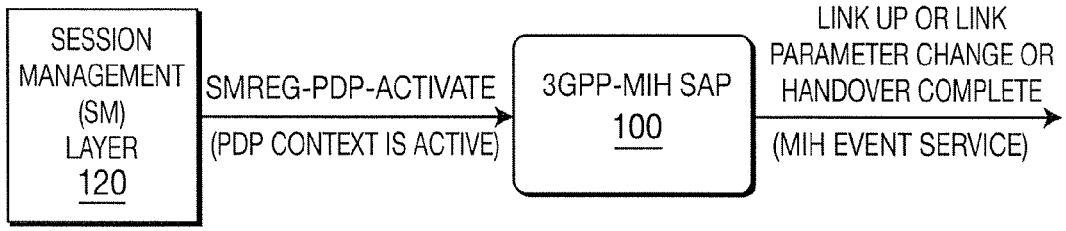
FIG. 14 is an example of mapping a 3GPP service primitive to an MIH event service when an SM layer indicates that a packet data protocol (PDP) context is active.

FIG. 14 is an example of mapping a 3GPP service primitive to an MIH event service when the SM layer 120 indicates that a PDP context is active. As indicated by Table 1 above, the processor 205 in the SAP 100 illustrated in FIG. 2 outputs a link up event service, a link parameter change event service or a handover complete event service in response to receiving a 3GPP service primitive from the SM layer 120 that indicates that a PDP context is active. This MIH event service may be applicable to any type of standard, such as IEEE 802.21 and the like.

Figure 15:
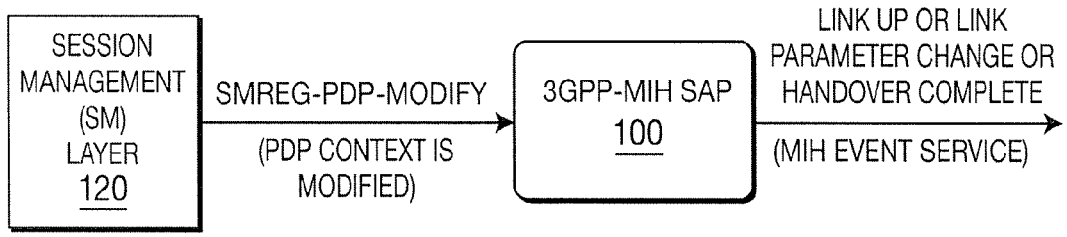
FIG. 15 is an example of mapping a 3GPP service primitive to an MIH event service when an SM layer indicates that a PDP context is modified.

FIG. 15 is an example of mapping a 3GPP service primitive to an MIH event service when the SM layer 120 indicates that a PDP context is modified. As indicated by Table 1 above, the processor 205 in the SAP 100 illustrated in FIG. 2 outputs a link up event service, a link parameter change event service or a handover complete event service in response to receiving a 3GPP service primitive from the SM layer 120 that indicates that a PDP context has been modified. This MIH event service may be applicable to any type of standard, such as IEEE 802.21 and the like.

Figure 16:
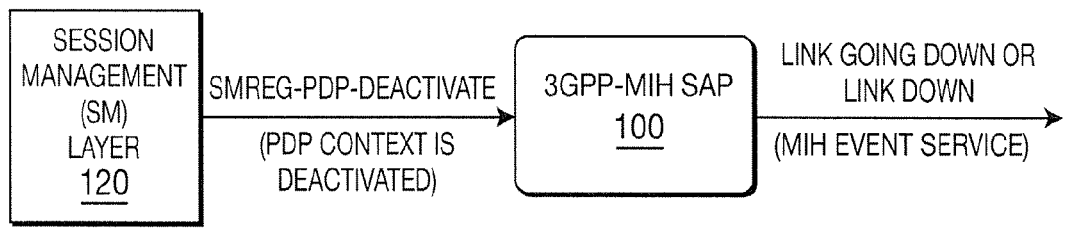
FIG. 16 is an example of mapping a 3GPP service primitive to an MIH event service when an SM layer indicates that a PDP context is deactivated.

FIG. 16 is an example of mapping a 3GPP service primitive to an MIH event service when the SM layer 120 indicates that a PDP context is deactivated. As indicated by Table 1 above, the processor 205 in the SAP 100 illustrated in FIG. 2 outputs a link going down event service or a link down event service in response to receiving a 3GPP service primitive from the SM layer 120 that indicates that a PDP context has been deactivated. This MIH event service may be applicable to any type of standard, such as IEEE 802.21 and the like.

Table 2 identifies specific 3GPP service primitives for each of the layers of the UMTS 140 and the LTE system 145 shown in FIG. 1. According to the present invention, the 3GPP service primitives generated by the UMTS 140 via the NAS 130 and the AS 135, as well as the 3GPP service primitives generated by the LTE via the E-UTRA/E-CORE system 150, are mapped to MIH event services, (e.g., IEEE 802.21 events), as shown in Table 2 below.

TABLE 2

| 3GPP Layer | 3GPP Service Primitive Descriptions | 3GPP Service Primitive | MIH Event Service (e.g., IEEE 802.21 Event) |
|---|---|---|---|
| NAS | Station is attached | GMMREG-ATTACH | Link Parameter Change |
| | Station is detached | GMMREG-DETACH | Link Parameter Change |
| | PDP Context is active | SMREG-PDP-ACTIVATE | Link Up/Handover Complete/Link Parameter Change |
| | PDP Context is modified | SMREG-PDP-MODIFY | Link Parameter Change/Link Up |
| | PDP Context is deactivated | SMREG-PDP-DEACTIVATE | Link Down/Link Parameter Change |
| | Radio Access Bearer is activated for data transfer | RABMSM-ACTIVATE | Link Up/Link Parameter Change/Handover Complete |
| | Radio Access Bearer is deactivated for data transfer | RABMSM-DEACTIVATE | Link Down/Link Parameter Change |
| | Radio Access Bearer is modified for data transfer | RABMSM-MODIFY | Link Parameter Change/Link Up/Handover Complete |
| | Radio Access Bearer data transfer error | RABMSM-STATUS | Link Down |
| AS | Radio Access Bearer has been activated | RABMAS-RAB-ESTABLISH | Link Up/Handover Complete |

TABLE 2-continued

| 3GPP Layer | 3GPP Service Primitive Descriptions | 3GPP Service Primitive | MIH Event Service (e.g., IEEE 802.21 Event) |
|---|---|---|---|
| | Radio Access Bearer has been released | RABMAS-RAB-RELEASE | Link Down |
| | AS failure Indication | RABMAS-STATUS | Link Down |
| | Information regarding geographical area. | Information Broadcast | Link Parameter Change |
| | Notification of paging for particular user or terminal | Paging Request | Link Parameter Change |
| | Notification information for all users | Notification Broadcast | Link Parameter Change |
| | Notification information for a specific or for many user | Notification Indication | Link Parameter Change |
| | UE initiated connection establishment | Connection Establishment | Link Up |
| | Network initiated connection release | Infrastructure Side Initiated Connection Release | Link Down |
| | Network initiated Radio Access Bearer Establishment | Infrastructure Side Initiated Radio Access Bearer Establishment | Link Up/Link Detected |
| | Network initiated Radio Access Bearer Release | Infrastructure Side Initiated Radio Access Bearer Release | Link Down |
| | Indication that the connection may be aborted unless streamlining is done | Streamlining Required Indication | Link Going Down |
| | Location information provided by the network for a specific UE | UE location information | Link Parameter Change |
| | Connection loss indications | Connection loss indication | Link Down |
| E-UTRAN/E-CORE | The location of the UE is now known by the network | LTE-detached | Link Parameter Change |
| | The UE is known to the network but no transport channel is established | LTE-idle | Link Parameter Change/Link Down |
| | Radio resources have been established and the UE is able to perform UL and DL transport of PDU | LTE-Active | Link Up/Link Handover Complete |

Figure 17:
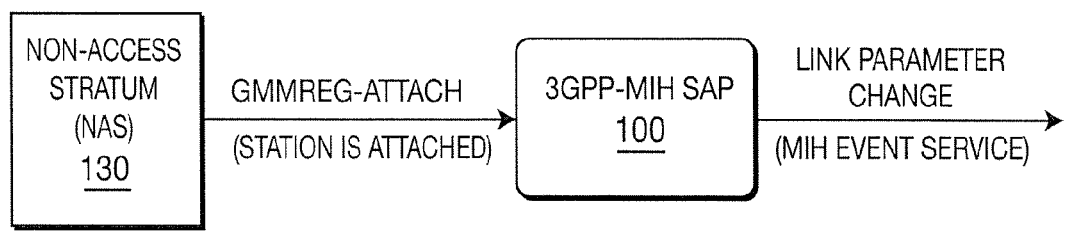
FIG. 17 is an example of mapping a 3GPP service primitive to an MIH event service when an NAS indicates that a station is attached.

FIG. 17 is an example of mapping a 3GPP service primitive to an MIH event service when the NAS 130 indicates that a station is attached. As indicated by Table 2 above, the processor 205 in the SAP 100 illustrated in FIG. 2 outputs a link parameter change event service in response to receiving a 3GPP service primitive from the NAS 130 that indicates that a station is attached. This MIH event service may be applicable to any type of standard, such as IEEE 802.21 and the like.

Figure 18:
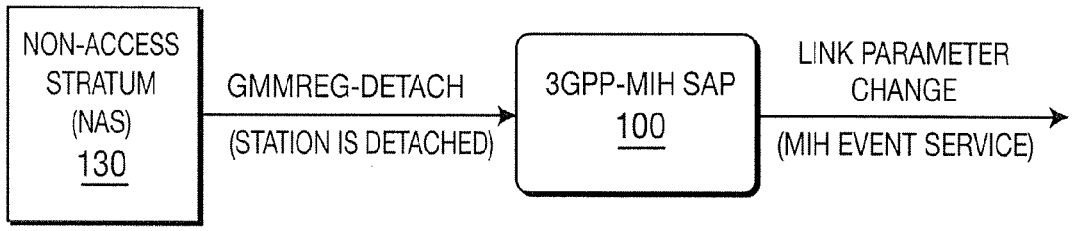
FIG. 18 is an example of mapping a 3GPP service primitive to an MIH event service when an NAS indicates that a station is detached.

FIG. 18 is an example of mapping a 3GPP service primitive to an MIH event service when the NAS 130 indicates that a station is detached. As indicated by Table 2 above, the processor 205 in the SAP 100 illustrated in FIG. 2 outputs a link parameter change event service in response to receiving a 3GPP service primitive from the NAS 130 that indicates that a station is detached. This MIH event service may be applicable to any type of standard, such as IEEE 802.21 and the like.

Figure 19:
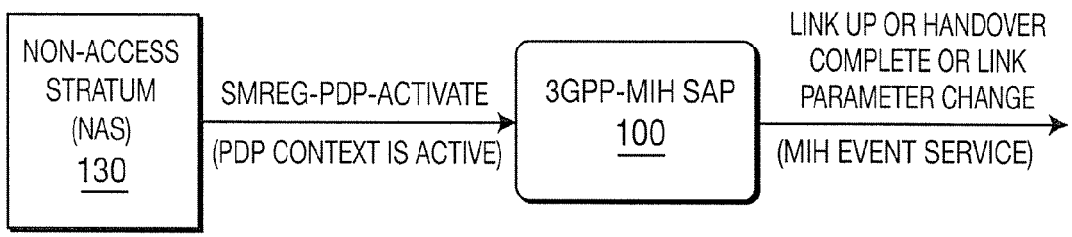
FIG. 19 is an example of mapping a 3GPP service primitive to an MIH event service when an NAS indicates that a PDP context is active.

FIG. 19 is an example of mapping a 3GPP service primitive to an MIH event service when the NAS 130 indicates that a PDP context is active. As indicated by Table 2 above, the processor 205 in the SAP 100 illustrated in FIG. 2 outputs a link up event service, a handover complete event service or a link parameter change event service in response to receiving a 3GPP service primitive from the NAS 130 that indicates that a PDP context is active. This MIH event service may be applicable to any type of standard, such as IEEE 802.21 and the like.

Figure 20:
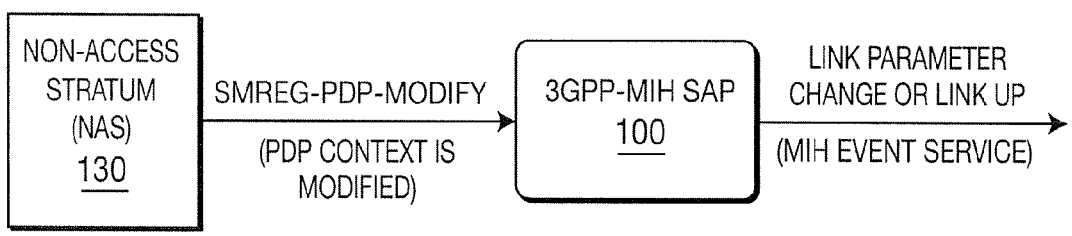
FIG. 20 is an example of mapping a 3GPP service primitive to an MIH event service when an NAS indicates that a PDP context is modified.

FIG. 20 is an example of mapping a 3GPP service primitive to an MIH event service when the NAS 130 indicates that a PDP context is modified. As indicated by Table 2 above, the processor 205 in the SAP 100 illustrated in FIG. 2 outputs a link parameter change event service or a link up event service in response to receiving a 3GPP service primitive from the NAS 130 that indicates that a PDP context is modified. This MIH event service may be applicable to any type of standard, such as IEEE 802.21 and the like.

Figure 21:
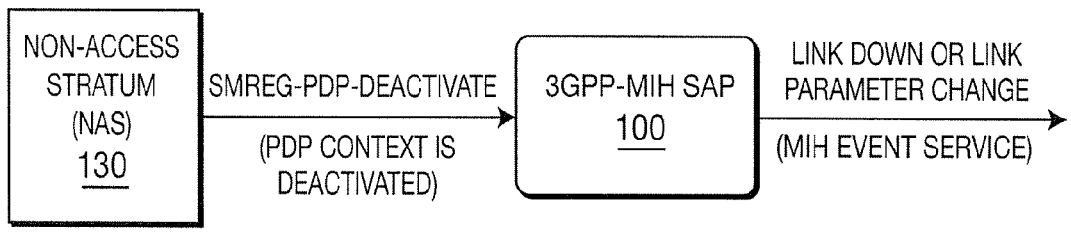
FIG. 21 is an example of mapping a 3GPP service primitive to an MIH event service when an NAS indicates that a PDP context is deactivated.

FIG. 21 is an example of mapping a 3GPP service primitive to an MIH event service when the NAS 130 indicates that a PDP context is deactivated. As indicated by Table 2 above, the processor 205 in the SAP 100 illustrated in FIG. 2 outputs a link down event service or a link parameter change event service in response to receiving a 3GPP service primitive from the NAS 130 that indicates that a PDP context is deactivated. This MIH event service may be applicable to any type of standard, such as IEEE 802.21 and the like.

Figure 22:
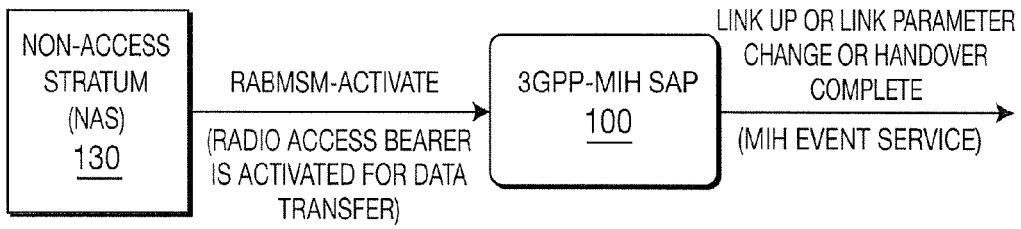
FIG. 22 is an example of mapping a 3GPP service primitive to an MIH event service when an NAS indicates that a radio access bearer (RAB) is activated for data transfer.

FIG. 22 is an example of mapping a 3GPP service primitive to an MIH event service when the NAS 130 indicates that a RAB is activated for data transfer. As indicated by Table 2 above, the processor 205 in the SAP 100 illustrated in FIG. 2 outputs a link up event service, a link parameter change event service or a handover complete event service in response to receiving a 3GPP service primitive from the NAS 130 that indicates that a RAB is activated for data transfer. This MIH event service may be applicable to any type of standard, such as IEEE 802.21 and the like.

Figure 23:
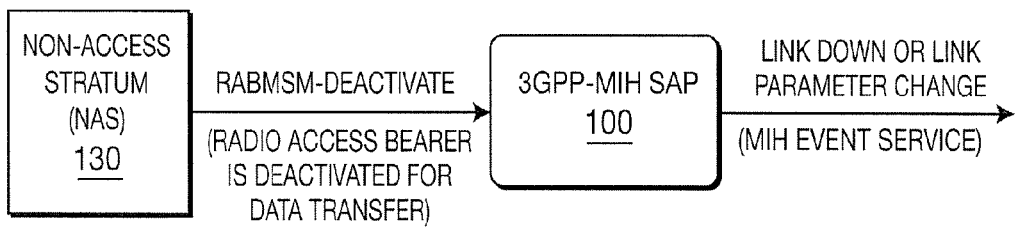
FIG. 23 is an example of mapping a 3GPP service primitive to an MIH event service when an NAS indicates that a RAB is deactivated for data transfer.

FIG. 23 is an example of mapping a 3GPP service primitive to an MIH event service when the NAS 130 indicates that a RAB is deactivated for data transfer. As indicated by Table 2 above, the processor 205 in the SAP 100 illustrated in FIG. 2 outputs a link down event service or a link parameter change event service in response to receiving a 3GPP service primitive from the NAS 130 that indicates that a RAB is deactivated for data transfer. This MIH event service may be applicable to any type of standard, such as IEEE 802.21 and the like.

Figure 24:
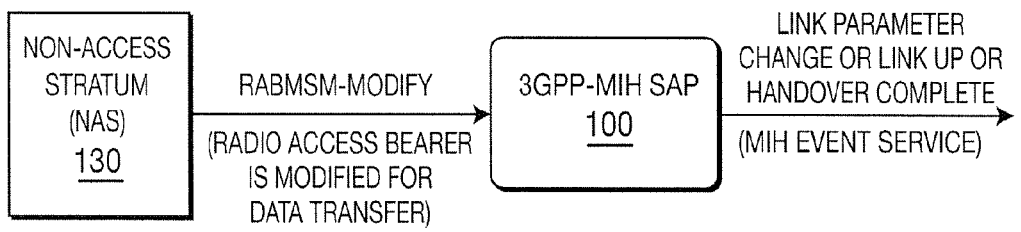
FIG. 24 is an example of mapping a 3GPP service primitive to an MIH event service when an NAS indicates that a RAB is modified for data transfer.

FIG. 24 is an example of mapping a 3GPP service primitive to an MIH event service when the NAS 130 indicates that a RAB is modified for data transfer. As indicated by Table 2 above, the processor 205 in the SAP 100 illustrated in FIG. 2 outputs a link parameter change event service, a link up event service or a handover complete event service in response to receiving a 3GPP service primitive from the NAS 130 that indicates that a RAB is modified for data transfer. This MIH event service may be applicable to any type of standard, such as IEEE 802.21 and the like.

Figure 25:
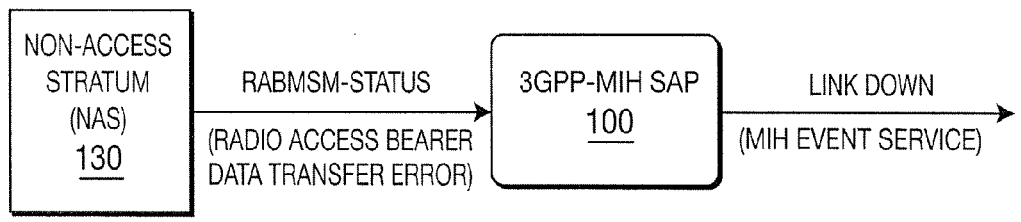
FIG. 25 is an example of mapping a 3GPP service primitive to an MIH event service when an NAS indicates that a RAB data transfer error has occurred.

FIG. 25 is an example of mapping a 3GPP service primitive to an MIH event service when the NAS 130 indicates that a RAB data transfer error has occurred. As indicated by Table 2 above, the processor 205 in the SAP 100 illustrated in FIG. 2 outputs a link down event service in response to receiving a 3GPP service primitive from the NAS 130 that indicates that a RAB data transfer error has occurred. This MIH event service may be applicable to any type of standard, such as IEEE 802.21 and the like.

Figure 26:
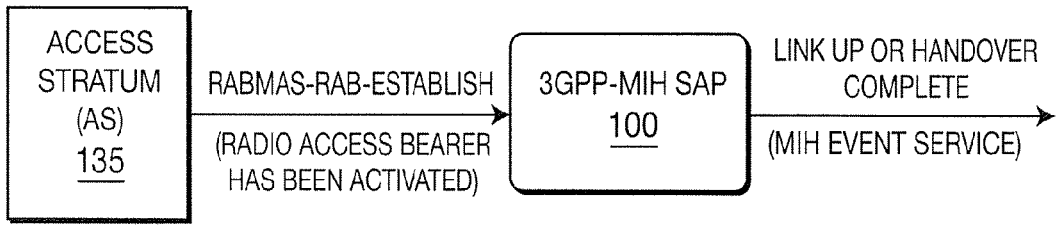
FIG. 26 is an example of mapping a 3GPP service primitive to an MIH event service when an AS indicates that a RAB has been activated.

FIG. 26 is an example of mapping a 3GPP service primitive to an MIH event service when the AS 135 indicates that a RAB has been activated. As indicated by Table 2 above, the processor 205 in the SAP 100 illustrated in FIG. 2 outputs a link up event service or a handover complete event service in response to receiving a 3GPP service primitive from the NAS 130 that indicates that a RAB has been activated. This MIH event service may be applicable to any type of standard, such as IEEE 802.21 and the like.

Figure 27:
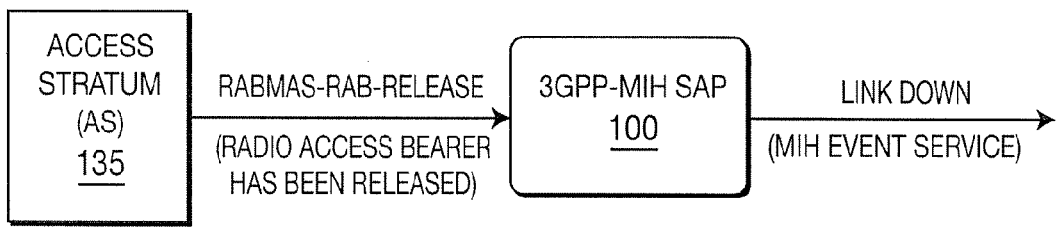
FIG. 27 is an example of mapping a 3GPP service primitive to an MIH event service when an AS indicates that a RAB has been released.

FIG. 27 is an example of mapping a 3GPP service primitive to an MIH event service when the AS 135 indicates that a RAB has been released. As indicated by Table 2 above, the processor 205 in the SAP 100 illustrated in FIG. 2 outputs a link down event service in response to receiving a 3GPP service primitive from the AS 135 that indicates that a RAB has been released. This MIH event service may be applicable to any type of standard, such as IEEE 802.21 and the like.

Figure 28:
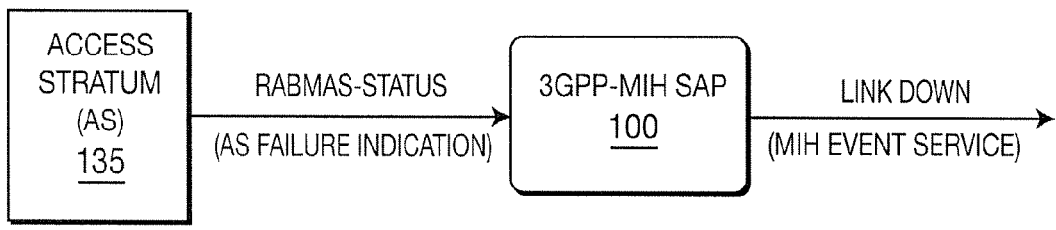
FIG. 28 is an example of mapping a 3GPP service primitive to an MIH event service when an AS failure occurs.

FIG. 28 is an example of mapping a 3GPP service primitive to an MIH event service when a failure of the AS 135 occurs. As indicated by Table 2 above, the processor 205 in the SAP 100 illustrated in FIG. 2 outputs a link down event service in response to receiving a 3GPP service primitive from the AS 135 that indicates that AS 135 has failed. This MIH event service may be applicable to any type of standard, such as IEEE 802.21 and the like.

Figure 29:
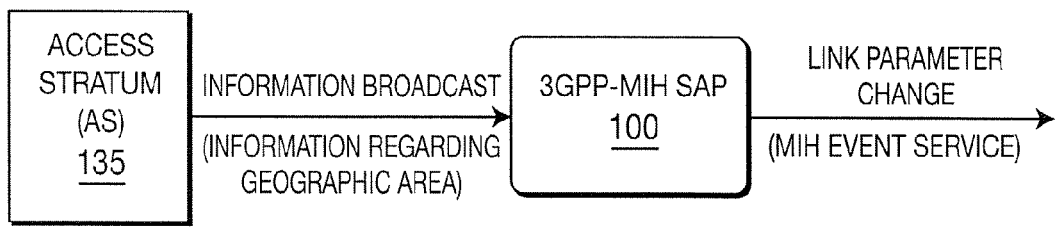
FIG. 29 is an example of mapping a 3GPP service primitive to an MIH event service when an AS broadcasts information regarding a geographic area.

FIG. 29 is an example of mapping a 3GPP service primitive to an MIH event service when the AS 135 broadcasts information regarding a geographic area. As indicated by Table 2 above, the processor 205 in the SAP 100 illustrated in FIG. 2 outputs a link parameter change event service in response to receiving a 3GPP service primitive from the AS 135 that includes information regarding a geographic area. This MIH event service may be applicable to any type of standard, such as IEEE 802.21 and the like.

Figure 30:
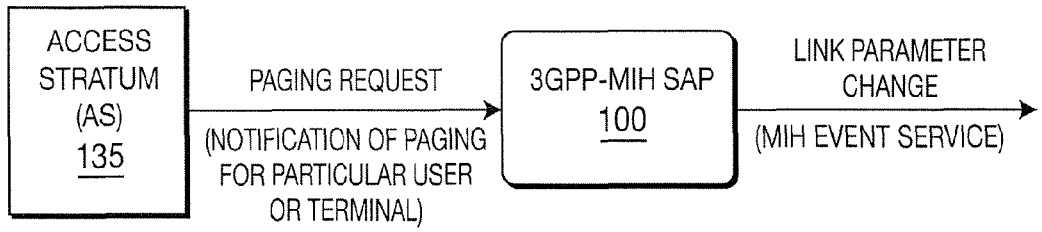
FIG. 30 is an example of mapping a 3GPP service primitive to an MIH event service when an AS provides notification of paging for a particular user or terminal.

FIG. 30 is an example of mapping a 3GPP service primitive to an MIH event service when the AS 135 provides notification of paging for a particular user or terminal. As indicated by Table 2 above, the processor 205 in the SAP 100 illustrated in FIG. 2 outputs a link parameter change event service in response to receiving a 3GPP service primitive from the AS 135 that provides notification of paging for a particular user or terminal. This MIH event service may be applicable to any type of standard, such as IEEE 802.21 and the like.

Figure 31:
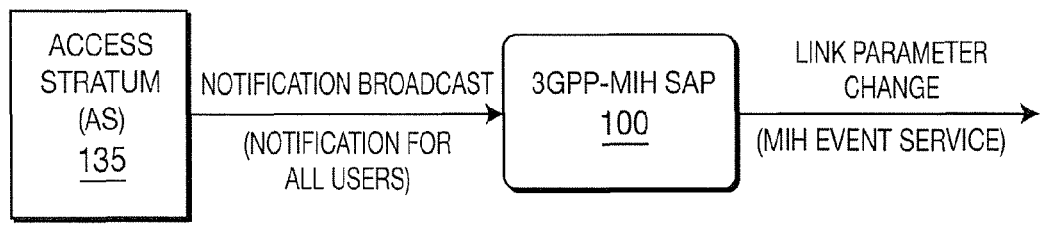
FIG. 31 is an example of mapping a 3GPP service primitive to an MIH event service when an AS provides a notification for all users.

FIG. 31 is an example of mapping a 3GPP service primitive to an MIH event service when the AS 135 provides a notification for all users. As indicated by Table 2 above, the processor 205 in the SAP 100 illustrated in FIG. 2 outputs a link parameter change event service in response to receiving a 3GPP service primitive from the AS 135 that provides notification information for all users. This MIH event service may be applicable to any type of standard, such as IEEE 802.21 and the like.

Figure 32:
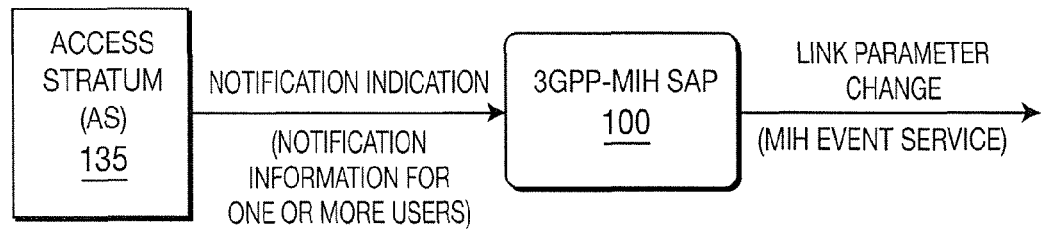
FIG. 32 is an example of mapping a 3GPP service primitive to an MIH event service when an AS provides notification information for one or more users.

FIG. 32 is an example of mapping a 3GPP service primitive to an MIH event service when the AS 135 provides notification information for one or more users. As indicated by Table 2 above, the processor 205 in the SAP 100 illustrated in FIG. 2 outputs a link parameter change event service in response to receiving a 3GPP service primitive from the AS 135 that provides a notification for one or more users. This MIH event service may be applicable to any type of standard, such as IEEE 802.21 and the like.

Figure 33:
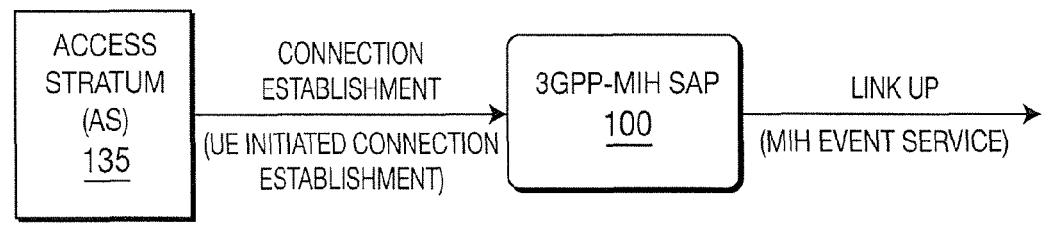
FIG. 33 is an example of mapping a 3GPP service primitive to an MIH event service when an AS indicates a user equipment (UE) initiated connection establishment.

FIG. 33 is an example of mapping a 3GPP service primitive to an MIH event service when the AS 135 indicates a UE initiated connection establishment. As indicated by Table 2 above, the processor 205 in the SAP 100 illustrated in FIG. 2 outputs a link up event service in response to receiving a 3GPP service primitive from the AS 135 that indicates a UE initiated connection establishment. This MIH event service may be applicable to any type of standard, such as IEEE 802.21 and the like.

Figure 34:
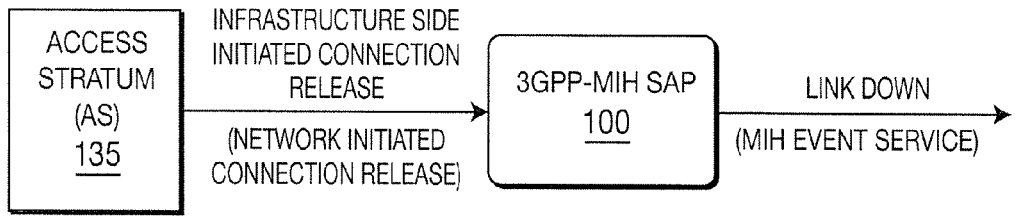
FIG. 34 is an example of mapping a 3GPP service primitive to an MIH event service when an AS indicates a network initiated connection release.

FIG. 34 is an example of mapping a 3GPP service primitive to an MIH event service when the AS 135 indicates a network initiated connection release. As indicated by Table 2 above, the processor 205 in the SAP 100 illustrated in FIG. 2 outputs a link down event service in response to receiving a 3GPP service primitive from the AS 135 that indicates an infrastructure side, (i.e., network), initiated connection release. This MIH event service may be applicable to any type of standard, such as IEEE 802.21 and the like.

Figure 35:
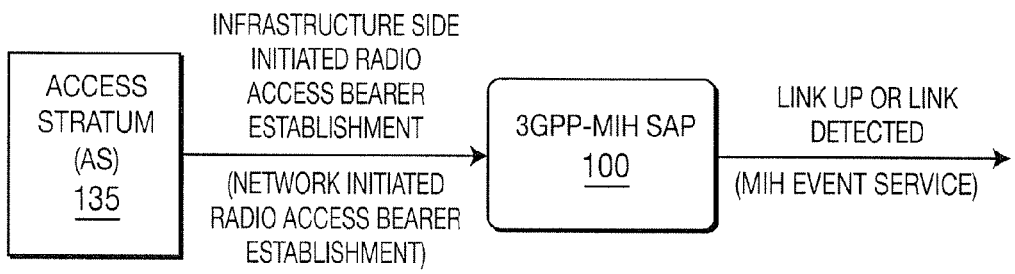
FIG. 35 is an example of mapping a 3GPP service primitive to an MIH event service when an AS indicates a network initiated RAB establishment.

FIG. 35 is an example of mapping a 3GPP service primitive to an MIH event service when the AS 135 indicates a network initiated RAB establishment. As indicated by Table 2 above, the processor 205 in the SAP 100 illustrated in FIG. 2 outputs a link up event service or a link detected event service in response to receiving a 3GPP service primitive from the AS 135 that indicates an infrastructure side, (i.e., network), initiated RAB establishment. This MIH event service may be applicable to any type of standard, such as IEEE 802.21 and the like.

Figure 36:
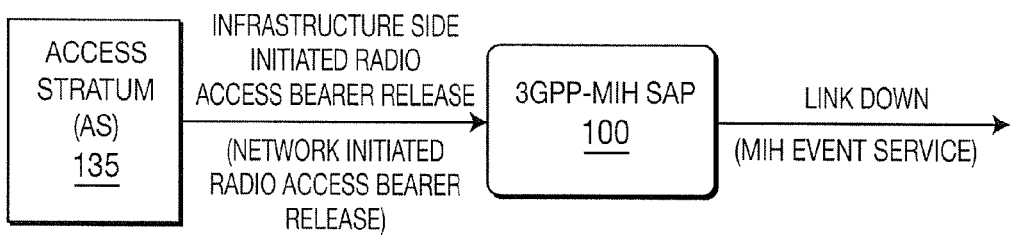
FIG. 36 is an example of mapping a 3GPP service primitive to an MIH event service when an AS indicates a network initiated RAB release.

FIG. 36 is an example of mapping a 3GPP service primitive to an MIH event service when the AS 135 indicates a network initiated RAB release. As indicated by Table 2 above, the processor 205 in the SAP 100 illustrated in FIG. 2 outputs a link down event service in response to receiving a 3GPP service primitive from the AS 135 that indicates an infrastructure side, (i.e., network), initiated RAB release. This MIH event service may be applicable to any type of standard, such as IEEE 802.21 and the like.

Figure 37:
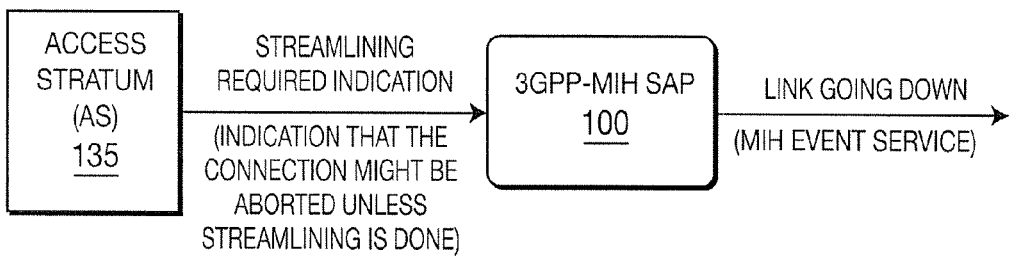
FIG. 37 is an example of mapping a 3GPP service primitive to an MIH event service when an AS indicates the potential for an aborted connection unless streamlining is performed.

FIG. 37 is an example of mapping a 3GPP service primitive to an MIH event service when the AS 135 indicates the potential for an aborted connection unless streamlining is performed. As indicated by Table 2 above, the processor 205 in the SAP 100 illustrated in FIG. 2 outputs a link going down event service in response to receiving a 3GPP service primitive from the AS 135 that indicates the potential for an aborted connection unless streamlining is performed. This MIH event service may be applicable to any type of standard, such as IEEE 802.21 and the like.

Figure 38:
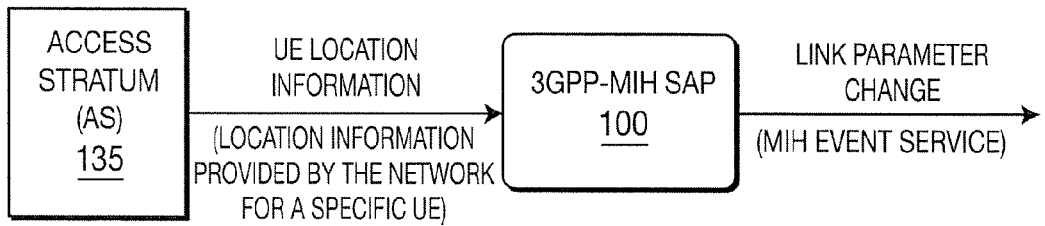
FIG. 38 is an example of mapping a 3GPP service primitive to an MIH event service when an AS indicates location information provided by a network for a specific UE.

FIG. 38 is an example of mapping a 3GPP service primitive to an MIH event service when the AS 135 indicates location information provided by a network for a specific UE. As indicated by Table 2 above, the processor 205 in the SAP 100 illustrated in FIG. 2 outputs a link parameter change event service in response to receiving a 3GPP service primitive from the AS 135 that indicates location information provided by a network for a specific UE. This MIH event service may be applicable to any type of standard, such as IEEE 802.21 and the like.

Figure 39:
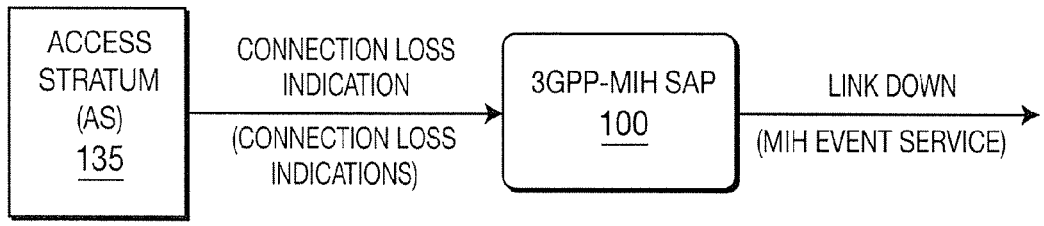
FIG. 39 is an example of mapping a 3GPP service primitive to an MIH event service when an AS indicates a connection loss.

FIG. 39 is an example of mapping a 3GPP service primitive to an MIH event service when the AS 135 indicates a connection loss. As indicated by Table 2 above, the processor 205 in the SAP 100 illustrated in FIG. 2 outputs a link down event service in response to receiving a 3GPP service primitive from the AS 135 that indicates a connection loss. This MIH event service may be applicable to any type of standard, such as IEEE 802.21 and the like.

Figure 40:
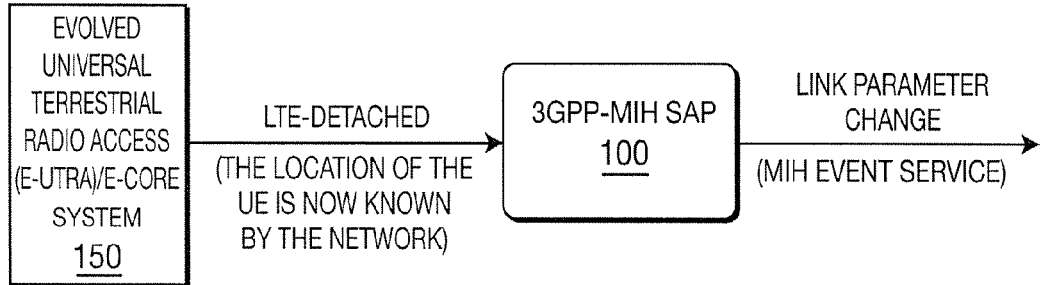
FIG. 40 is an example of mapping a 3GPP service primitive to an MIH event service when an E-UTRA/E-CORE system indicates that the location of a UE is now known by a network.

FIG. 40 is an example of mapping a 3GPP service primitive to an MIH event service when the E-UTRA/E-CORE system 150 indicates that the location of a UE is now known by a network. As indicated by Table 2 above, the processor 205 in the SAP 100 illustrated in FIG. 2 outputs a link parameter change event service in response to receiving a 3GPP service primitive from the E-UTRA/E-CORE system 150 that indicates that the location of a UE is now known by a network. This MIH event service may be applicable to any type of standard, such as IEEE 802.21 and the like.

Figure 41:
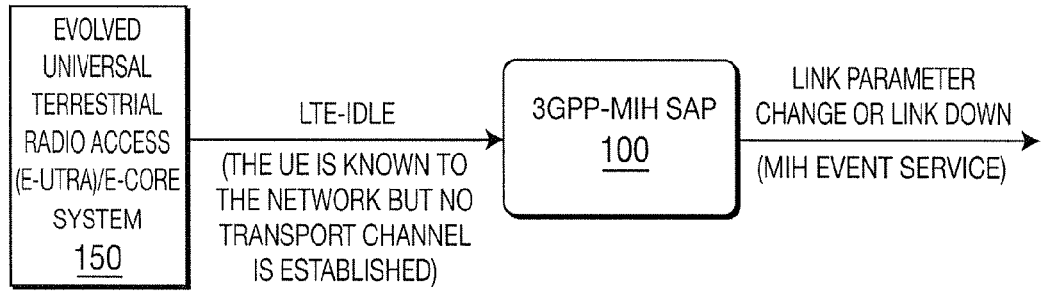
FIG. 41 is an example of mapping a 3GPP service primitive to an MIH event service when an E-UTRA/E-CORE system indicates that the location of a UE is known to a network but no transport channel is established.

FIG. 41 is an example of mapping a 3GPP service primitive to an MIH event service when the E-UTRA/E-CORE system 150 indicates that the location of a UE is known to a network but no transport channel is established. As indicated by Table 2 above, the processor 205 in the SAP 100 illustrated in FIG. 2 outputs a link parameter change event service or a link down event service in response to receiving a 3GPP service primitive from the E-UTRA/E-CORE system 150 that indicates that the location of a UE is known to a network but no transport channel is established. This MIH event service may be applicable to any type of standard, such as IEEE 802.21 and the like.

Figure 42:
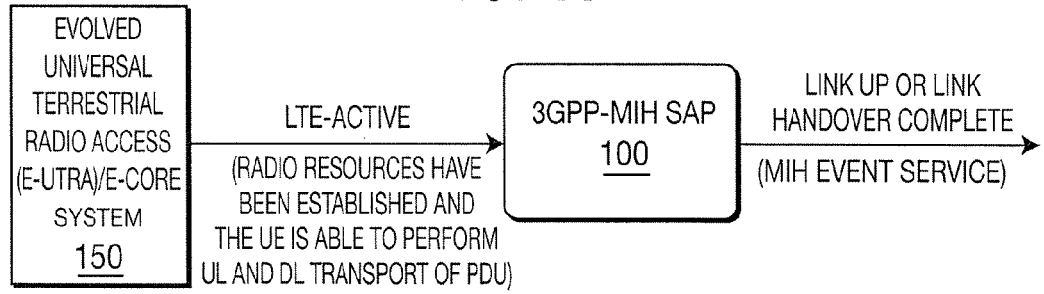
FIG. 42 is an example of mapping a 3GPP service primitive to an MIH event service when an E-UTRA/E-CORE system indicates that radio resources have been established and that a UE is able to perform uplink (UL) and downlink (DL) transport of a protocol data unit (PDU).

FIG. 42 is an example of mapping a 3GPP service primitive to an MIH event service when the E-UTRA/E-CORE system 150 indicates that radio resources have been established and that a UE is able to perform UL and DL transport of a PDU. As indicated by Table 2 above, the processor 205 in the SAP 100 illustrated in FIG. 2 outputs a link up event service or a link handover complete event service in response to receiving a 3GPP service primitive from the E-UTRA/E-CORE system 150 that indicates that radio resources have been established and that a UE is able to perform UL and DL transport of a PDU. This MIH event service may be applicable to any type of standard, such as IEEE 802.21 and the like.

It should be noted that the specific mapping of a 3GPP service primitive to an MIH event service, (e.g., an IEEE 802.21 event), may change. In particular, primitives for SAE and LTE currently remain undefined. However, the present invention demonstrates how mapping service primitives to event services may easily be adapted or used to provide triggers.

Although the features and elements of the present invention are described in the preferred embodiments in particular combinations, each feature or element can be used alone (without the other features and elements of the preferred embodiments) or in various combinations with or without other features and elements of the present invention.

What is claimed is:

1. A method for use in a Media Independent Handover (MIH)-capable wireless transmit/receive unit (WTRU), the method comprising:
   receiving a Third Generation Partnership Project (3GPP) data session active primitive;
   providing an MIH link up event to an upper layer in response to the data session active primitive;
   receiving a 3GPP data session deactivated primitive; and
   providing an MIH link down event to the upper layer in response to the data session deactivated primitive.

2. The method of claim 1, further comprising:
   receiving a 3GPP data session modified primitive; and
   providing an MIH link parameter change event to the upper layer in response to the data session modified primitive.

3. The method of claim 1, further comprising:
   receiving a 3GPP data session terminated due to unrecoverable error primitive; and
   providing an MIH link down event to the upper layer in response to the data session terminated due to unrecoverable error primitive.

4. A wireless transmit/receive unit (WTRU), the WTRU comprising:
   circuitry configured:
      to receive a Third Generation Partnership Project (3GPP) data session active primitive;
      to provide a Media Independent Handover (MIH) link up event to an upper layer in response to the data session active primitive;
      to receive a 3GPP data session deactivated primitive; and
      to provide an MIH link down event to the upper layer in response to the data session deactivated primitive.

5. The WTRU of claim 4, wherein the circuitry is further configured:
   to receive a 3GPP data session modified primitive; and
   to provide an MIH link parameter change event to the upper layer in response to the data session modified primitive.

6. The WTRU of claim 4, wherein the circuitry is further configured:
   to receive a 3GPP data session terminated due to unrecoverable error primitive; and to provide an MIH link down event to the upper layer in response to the data session terminated due to unrecoverable error primitive.

7. A method for use in a Media Independent Handover (MIH)-capable wireless transmit/receive unit (WTRU), the method comprising:
receiving a Third Generation Partnership Project (3GPP) radio access bearer is activated for data transfer (RABMSM-ACTIVATE) primitive;
providing an MIH link up event to an upper layer in response to the RABMSM-ACTIVATE primitive;
receiving a 3GPP radio access bearer is deactivated for data transfer (RABMSM-DEACTIVATE) primitive; and
providing an MIH link down event to the upper layer in response to the RABMSM-DEACTIVATE primitive.

8. The method of claim 7, further comprising:
receiving a 3GPP radio access bearer is modified for data transfer (RABMSM-MODIFY) primitive; and
providing an MIH link parameter change event to the upper layer in response to the RABMSM-MODIFY primitive.

9. The method of claim 7, further comprising:
receiving a 3GPP radio access bearer data transfer error (RABMSM-STATUS) primitive; and
providing an MIH link down event to the upper layer in response to the RABMSM-STATUS primitive.

10. The method of claim 7, further comprising:
receiving a 3GPP radio access bearer has been activated (RABMAS-RAB-ESTABLISH) primitive; and
providing an MIH handover complete event to the upper layer in response to the RABMAS-RAB-ESTABLISH primitive.

11. The method of claim 7, further comprising:
receiving a 3GPP radio access bearer has been released (RABMAS-RAB-RELEASE) primitive; and
providing an MIH link down event to the upper layer in response to the RABMAS-RAB-RELEASE primitive.

12. The method of claim 7, further comprising:
receiving a 3GPP packet data protocol (PDP) context is modified (SMREG-PDP-MODIFY) primitive; and
providing an MIH link parameter change event to the upper layer in response to the SMREG-PDP-MODIFY primitive.

13. A wireless transmit/receive unit (WTRU), the WTRU comprising:
circuitry configured:
to receive a Third Generation Partnership Project (3GPP) radio access bearer is activated for data transfer (RABMSM-ACTIVATE) primitive;
to provide a Media Independent Handover (MIH) link up event to an upper layer in response to the RABMSM-ACTIVATE primitive;
to receive a 3GPP radio access bearer is deactivated for data transfer (RABMSM-DEACTIVATE) primitive; and
to provide an MIH link down event to the upper layer in response to the RABMSM-DEACTIVATE primitive.

14. The WTRU of claim 13, wherein the circuitry is further configured:
to receive a 3GPP radio access bearer is modified for data transfer (RABMSM-MODIFY) primitive; and
to provide an MIH link parameter change event to the upper layer in response to the RABMSM-MODIFY primitive.

15. The WTRU of claim 13, wherein the circuitry is further configured:
to receive a 3GPP radio access bearer data transfer error (RABMSM-STATUS) primitive; and to provide an MIH link down event to the upper layer in response to the RABMSM-STATUS primitive.

16. The WTRU of claim 13, wherein the circuitry is further configured:
to receive a 3GPP radio access bearer has been activated (RABMAS-RAB-ESTABLISH) primitive; and
to provide an MIH handover complete event to the upper layer in response to the RABMAS-RAB-ESTABLISH primitive.

17. The WTRU of claim 13, wherein the circuitry is further configured:
to receive a 3GPP radio access bearer has been released (RABMAS-RAB-RELEASE) primitive; and
to provide an MIH link down event to the upper layer in response to the RABMAS-RAB-RELEASE primitive.

18. The WTRU of claim 13, further comprising wherein the circuitry is further configured:
to receive a 3GPP packet data protocol (PDP) context is modified (SMREG-PDP-MODIFY) primitive; and
to provide an MIH link parameter change event to the upper layer in response to the SMREG-PDP-MODIFY primitive.

19. A method for use in a Media Independent Handover (MIH)-capable wireless transmit/receive unit (WTRU), the method comprising:
receiving a Third Generation Partnership Project (3GPP) user equipment (UE) location is now known to the network (LTE-detached) primitive;
providing an MIH link parameter change event to an upper layer in response to the LTE-detached primitive;
receiving a 3GPP user equipment (UE) is known to the network but no transport channel is established (LTE-idle) primitive; and
providing an MIH link parameter change event or an MIH link down event to the upper layer in response to the LTE-idle primitive.

20. The method of claim 19, further comprising:
receiving a 3GPP radio resources have been established and a user equipment (UE) is able to uplink and downlink transport of a packet data unit (PDU) (LTE-active) primitive; and
providing an MIH link up event or an MIH link handover complete event to the upper layer in response to the LTE-active primitive.

21. A wireless transmit/receive unit (WTRU), the WTRU comprising:
circuitry configured:
to receive a Third Generation Partnership Project (3GPP) user equipment (UE) location is now known to the network (LTE-detached) primitive;
to provide a Media Independent Handover (MIH) link parameter change event to an upper layer in response to the LTE-detached primitive;
to receive a 3GPP user equipment (UE) is known to the network but no transport channel is established (LTE-idle) primitive; and
to provide an MIH link parameter change event or an MIH link down event to the upper layer in response to the LTE-idle primitive.

22. The WTRU of claim 21, wherein the circuitry is further configured:
to receive a 3GPP radio resources have been established and a user equipment (UE) is able to uplink and downlink transport of a packet data unit (PDU) (LTE-active) primitive; and to provide an MIH link up event or an MIH link handover complete event to the upper layer in response to the LTE-active primitive.

23. The method of claim 1 wherein the data session active primitive is an SMSM-ACTIVE primitive.

24. The method of claim 1 wherein the data session deactivate primitive is an SMSM-DEACTIVATE primitive.

25. The method of claim 2 wherein the data session modified primitive is an SMSM-MODIFY primitive.

26. The method of claim 3 wherein the data session terminated due to unrecoverable error primitive is an SMSM-STATUS primitive.

27. The WTRU of claim 4 wherein the data session active primitive is an SMSM-ACTIVE primitive.

28. The WTRU of claim 4 wherein the data session deactivate primitive is an SMSM-DEACTIVATE primitive.

29. The WTRU of claim 5 wherein the data session modified primitive is an SMSM-MODIFY primitive.

30. The WTRU of claim 6 wherein the data session terminated due to unrecoverable error primitive is an SMSM-STATUS primitive.

* * * * *

UNITED STATES PATENT AND TRADEMARK OFFICE
CERTIFICATE OF CORRECTION

PATENT NO. : 7,787,397 B2  
APPLICATION NO. : 11/554392  
DATED : August 31, 2010  
INVENTOR(S) : Ulises Olvera-Hernandez Page 1 of 1

It is certified that error appears in the above-identified patent and that said Letters Patent is hereby corrected as shown below:

IN THE SPECIFICATION

At column 4, line 33, after "on the use" insert --of--.

At column 4, line 65, after "layers", delete "155" and insert --150--.

At column 9, TABLE 2, second heading after "specific or for many", delete "user" and insert --users--.

At column 9, TABLE 2, under first heading delete "E-UTRAN/E-CORE" and insert --E-UTRA/E-CORE--.

IN THE CLAIMS

At Claim 18, column 16, line 16, after "claim 13," delete "further comprising".

Signed and Sealed this  
Eighth Day of November, 2011

David J. Kappos  
*Director of the United States Patent and Trademark Office*